(12) United States Patent
Sakurai

(10) Patent No.: US 12,278,398 B2
(45) Date of Patent: Apr. 15, 2025

(54) SEALED BATTERY AND METHOD OF MANUFACTURING SEALED BATTERY

(71) Applicant: Prime Planet Energy & Solutions, Inc., Tokyo (JP)

(72) Inventor: Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 560 days.

(21) Appl. No.: 17/544,874

(22) Filed: Dec. 7, 2021

(65) Prior Publication Data

US 2022/0190448 A1 Jun. 16, 2022

(30) Foreign Application Priority Data

Dec. 11, 2020 (JP) .................. 2020-205527

(51) Int. Cl.
*H01M 50/553* (2021.01)
*H01M 50/176* (2021.01)
(Continued)

(52) U.S. Cl.
CPC ....... *H01M 50/553* (2021.01); *H01M 50/176* (2021.01); *H01M 50/188* (2021.01); *H01M 50/55* (2021.01)

(58) Field of Classification Search
CPC ............. H01M 50/553; H01M 50/176; H01M 50/188; H01M 50/55; H01M 50/528;
(Continued)

(56) References Cited

U.S. PATENT DOCUMENTS

2014/0004409 A1 1/2014 Nakamura
2014/0030587 A1 1/2014 Tsuruta et al.
(Continued)

FOREIGN PATENT DOCUMENTS

CN 103515568 A 1/2014
CN 203751548 U 8/2014
(Continued)

OTHER PUBLICATIONS

English translation of WO-2012014510-A1 (Year: 2012).*

*Primary Examiner* — Ula C Ruddock
*Assistant Examiner* — Sarika Gupta
(74) *Attorney, Agent, or Firm* — HAUPTMAN HAM, LLP

(57) ABSTRACT

The present disclosure provides a technique for constructing an electrode terminal with superior conductivity. An electrode terminal disclosed herein includes: a first member which has a connecting portion that is exposed to outside of the case; and a second member which is a plate-shaped conductive member arranged outside of the case. In addition, the connecting portion penetrates the case and the second member and forms a cap portion having a flat plate shape outside of the second member. Furthermore, a plurality of recessed portions are formed on an upper surface of the cap portion, and a bonding portion due to an intermetallic bond is formed on a boundary, which is between the first member and the second member, below each of the recessed portions. Accordingly, a contact resistance between the first member and the second member can be reduced and conductivity of the electrode terminal can be improved.

11 Claims, 4 Drawing Sheets

(51) Int. Cl.
*H01M 50/188* (2021.01)
*H01M 50/55* (2021.01)

(58) Field of Classification Search
CPC ........... H01M 50/566; H01M 10/0404; H01M 10/0525; H01M 10/058; B23K 2101/36; B23K 20/10; Y02E 60/10
See application file for complete search history.

(56) References Cited

U.S. PATENT DOCUMENTS

| | | | |
|---|---|---|---|
| 2016/0181577 A1 | 6/2016 | Kajiwara et al. | |
| 2016/0372722 A1 | 12/2016 | Yoshida et al. | |
| 2019/0273240 A1 | 9/2019 | Hagino et al. | |
| 2020/0343518 A1 | 10/2020 | Yamamoto | |

FOREIGN PATENT DOCUMENTS

| | | | | |
|---|---|---|---|---|
| CN | 105849939 A | 8/2016 | | |
| CN | 106785354 A | 5/2017 | | |
| CN | 110224102 A | 9/2019 | | |
| CN | 111834602 A | 10/2020 | | |
| JP | 2001167751 A | 6/2001 | | |
| JP | 2007-229752 A | 9/2007 | | |
| JP | 2010-282846 A | 12/2010 | | |
| JP | 2011124024 A | 6/2011 | | |
| JP | 2013161629 A | 8/2013 | | |
| JP | 201426929 A | 2/2014 | | |
| JP | 5590391 B2 | 9/2014 | | |
| JP | 2014-212012 A | 11/2014 | | |
| JP | 2017228418 A | 12/2017 | | |
| JP | 20199045 A | 1/2019 | | |
| JP | 2020166969 A | 10/2020 | | |
| WO | WO-2012014510 A1 * | 2/2012 | ......... | H01M 2/0426 |
| WO | 2015025388 A1 | 2/2015 | | |

* cited by examiner

SEALED BATTERY AND METHOD OF MANUFACTURING SEALED BATTERY

CROSS REFERENCE TO RELATED APPLICATIONS

The present application claims priority on the basis of Japanese Patent Application No. 2020-205527 filed in Japan on Dec. 11, 2020, the entire contents of which are incorporated herein by reference.

BACKGROUND

1. Technical Field

The present disclosure is related to a sealed battery. Specifically, the present disclosure is related to a sealed battery in which an electrode body is housed inside a case and to a method of manufacturing the sealed battery.

2. Description of the Related Art

Today, secondary batteries such as lithium-ion secondary batteries and nickel-hydrogen batteries are being widely used in various fields such as vehicles and portable terminals. For example, such secondary batteries can adopt a form referred to as a sealed battery in which an electrode body is housed inside a sealed case. A sealed battery of this type is normally connected to an external device (a vehicle, a portable terminal, another battery, or the like) via an external conductive material (such as a busbar). The sealed battery is provided with an electrode terminal which is a conductive member that electrically connects the electrode body inside the case and the external conductive member with each other.

For example, the electrode terminal includes a first member which is connected to the electrode body inside the case and a second member which is connected to an external conductive material outside the case. In addition, the first member has a connecting portion that is exposed to the outside of the case. An upper end of the connecting portion of the first member penetrates the case and the second member and pressed and deformed (caulked) into a flat plate shape outside of the second member. Accordingly, the first member and the second member are electrically connected to each other and, at the same time, the first member and the second member are fixed to the case. In the present specification, the upper end of the connecting portion which is pressed and deformed into a flat plate shape will be referred to as a "cap portion".

In addition, the cap portion of the first member and the second member may be welded by a laser or the like in order to construct an electrode terminal with superior conductivity and strength. For example, Japanese Patent No. 5590391 discloses an example of a technique related to welding of the cap portion of the first member and the second member. Specifically, according to the technique described in Japanese Patent No. 5590391, a localized thin flat portion is formed in a peripheral edge portion of a caulked portion (cap portion). In addition, a connection terminal (the first member) and an external terminal (the second member) are laser spot-welded in the thin flat portion. Accordingly, favorable welding quality can be obtained.

SUMMARY

Contact resistance at an interface between the first member and the second member can have a significant impact on conductivity of the electrode terminal. Therefore, recently, in order to satisfy demands for reducing the battery resistance of a secondary battery, development of techniques for reducing the contact resistance in a connecting portion between the first member and the second member is called for. The present disclosure has been made in order to comply with such demands and a main object thereof is to provide a technique for constructing an electrode terminal in which a contact resistance between a first member and a second member is low and which has superior conductivity.

In order to achieve the object described above, the present disclosure provides a sealed battery configured as described below.

The sealed battery disclosed herein includes a case which houses an electrode body and an electrode terminal for electrically connecting the electrode body and an external conductive material with each other. The electrode terminal of the sealed battery is a conductive member to be connected to the electrode body inside the case, the electrode terminal including: a first member which has a connecting portion that is exposed to outside of the case; and a second member which is a plate-shaped conductive member arranged outside of the case, which has a connection region to be connected to the external conductive material, and which connected to the connecting portion of the first member. An upper end of the connecting portion of the first member penetrates the case and the second member and forms a cap portion having a flat plate shape outside of the second member. In addition, in the sealed battery disclosed herein, a plurality of recessed portions are formed on an upper surface of the cap portion, and a bonding portion configured due to an intermetallic bond is formed on a boundary, which is between the first member and the second member, below each of the plurality of recessed portions.

In the sealed battery disclosed herein, a plurality of recessed portions are formed in the cap portion of the first member. In addition, a bonding portion configured due to an intermetallic bond is formed on the boundary between the first member and the second member below the recessed portions. Although details will be provided later, the recessed portions and the bonding portion are formed by performing localized ultrasonic joining. In addition, the intermetallic bond formed by the ultrasonic joining is lower in resistance as compared to a welding mark formed by laser welding. Therefore, according to the technique disclosed herein, the contact resistance between the first member and the second member can be reduced and conductivity of the electrode terminal can be improved.

In a preferable aspect of the sealed battery disclosed herein, a shape of the cap portion in plan view is approximately circular. By providing such an approximately circular cap portion, localized ultrasonic joining with respect to the cap portion can be readily performed.

In a preferable aspect of the sealed battery disclosed herein, 3 to 12 recessed portions are formed on the upper surface of the cap portion. Accordingly, the first member and the second member can be preferably joined to each other.

In a preferable aspect of the sealed battery disclosed herein, 60% or more of the plurality of recessed portions are formed in a region, which opposes the connection region of the second member, of the upper surface of the cap portion. Accordingly, a conductive path in the electrode terminal can be shortened and conductivity of the electrode terminal can be further improved.

In a preferable aspect of the sealed battery disclosed herein, 60% or more of the plurality of recessed portions have a gap between an outer peripheral edge of the cap portion and the recessed portions. Accordingly, a bonding portion with a preferable width is formed on the boundary between the first member and the second member and the contact resistance between the first member and the second member can be further reduced.

In addition, in an aspect in which a gap is provided between the outer peripheral edge of the cap portion and the recessed portions, when a distance between an outer edge of the recessed portions to the outer peripheral edge of the cap portion is denoted by A and a distance between a center of the cap portion to the outer peripheral edge of the cap portion is denoted by B, 60% or more of the plurality of recessed portions are preferably formed at positions satisfying Expression (1) below. Accordingly, a bonding portion with a sufficient area can be readily formed on the boundary between the first member and the second member.

$$0 < A < 0.3B \tag{1}$$

In a preferable aspect of the sealed battery disclosed herein, the first member and the electrode body are directly connected to each other inside the case. The first member of the electrode terminal may be directly connected to the electrode body or indirectly connected to the electrode body via another conductive member. However, in consideration of an increase in conductivity of the electrode terminal, an increase in cost caused by a larger number of parts, and the like, the first member is preferably directly connected to the electrode body.

Furthermore, as another aspect of the technique disclosed herein, a method of manufacturing the sealed battery configured as described above is provided. The manufacturing method of the sealed battery comprises: a steps of performing assembly by arranging the second member outside of the case, causing a connecting portion of the first member to penetrate each of the case and the second member, and exposing an upper end of the connecting portion to outside of the case; a steps of performing caulking by forming a cap portion having a flat plate shape by pressing and deforming the upper end of the connecting portion of the first member toward the second member; and a steps of performing ultrasonic joining by forming a plurality of recessed portions on an upper surface of the cap portion by pressing the cap portion toward the second member by using a horn having a plurality of protruded portions and, at the same time, applying ultrasonic waves from each of the plurality of protruded portions, and forming a bonding portion configured due to an intermetallic bond on a boundary, which is between the first member and the second member, below each of the plurality of recessed portions.

In the manufacturing method configured as described above, the cap portion is pressed toward the second member using a horn having a plurality of protruded portions and, at the same time, ultrasonic waves are applied from each of the plurality of protruded portions. At this point, minute vibrations of the ultrasonic waves from the protruded portions cause the first member and the second member to rub against each other and cause a clean metal surface to be exposed on respective surfaces of the first member and the second member. In addition, pressure applied from the protruded portions cause each of the first member and the second member to plastically deform and the exposed clean metal surfaces are joined in a solid phase state. Accordingly, a bonding portion due to an intermetallic bond is formed between the first member and the second member. Since the bonding portion formed in this manner is lower in resistance as compared to a welding mark formed by laser welding, a contact resistance between the first member and the second member is low and an electrode terminal with superior conductivity can be obtained. In addition, by performing the localized ultrasonic joining described above, recessed portions which are dents in accordance with shapes of the protruded portions of the horn are formed on the upper surface of the cap portion having been pressed by the protruded portions.

In a preferable aspect of the manufacturing method disclosed herein, in the step of performing ultrasonic joining, pressure when each of the plurality of protruded portions presses the cap portion ranges from 10 N to 500 N. Accordingly, the bonding portion due to an intermetallic bond can be appropriately formed.

In a preferable aspect of the manufacturing method disclosed herein, in the step of performing ultrasonic joining, a frequency of the ultrasonic waves applied from the protruded portions ranges from 19 kHz to 81 kHz. Accordingly, the bonding portion due to an intermetallic bond can be appropriately formed.

In a preferable aspect of the manufacturing method disclosed herein, in the step of performing ultrasonic joining, a period of time during which the ultrasonic waves are applied ranges from 0.03 seconds to 3 seconds. Accordingly, the bonding portion due to an intermetallic bond can be appropriately formed.

DETAILED DESCRIPTION

Figure 1:
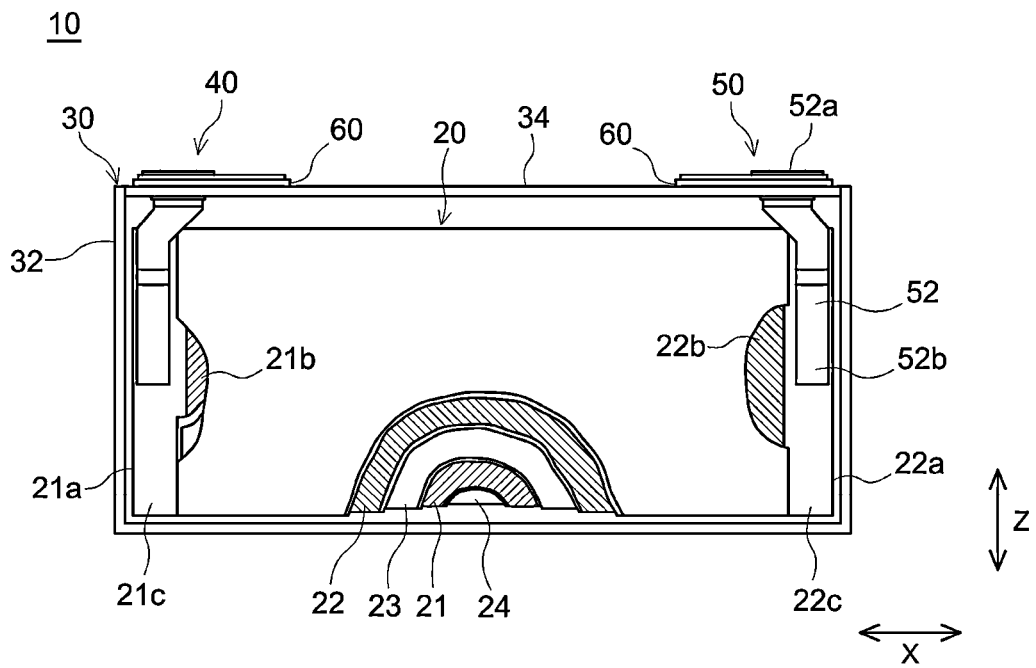
FIG. 1 is a partial sectional view in a front view of a sealed battery according to an embodiment.

Hereinafter, an embodiment of the technique disclosed herein will be described. It should be noted that, with the exception of matters specifically mentioned in the present specification, matters required to carry out the technique disclosed herein can be understood to be design matters of a person with ordinary skill in the art based on the prior art in the relevant technical field. In other words, the technique disclosed herein can be implemented based on the contents disclosed in the present specification and common general technical knowledge in the relevant field.

It should be noted that, in the drawings referred to in the following description, members and portions that produce same effects will be denoted by same reference signs. It should also be noted that dimensional relationships (a length, a width, a thickness, and the like) shown in the respective drawings do not reflect actual dimensional relationships. In addition, in the drawings, it is assumed that a reference sign X denotes a "width direction", a reference sign Y denotes a "depth direction", and a reference sign Z denotes a "height direction". However, it should be noted that such directions have merely been determined for the sake of illustration and are not intended to limit aspects of installation when a sealed battery is in use or when the sealed battery is being manufactured.

In addition, a "sealed battery" according to the present specification refers to a secondary battery structured such that an electrode body is housed inside a sealed case. Furthermore, a "secondary battery" refers to power storage devices in general in which a charge/discharge reaction occurs due to a movement of a charge carrier between a pair of electrodes (a positive electrode and a negative electrode) via an electrolyte. Such secondary batteries encompass so-called storage batteries such as a lithium ion secondary battery, a nickel hydride battery, and a nickel-cadmium battery as well as capacitors such as an electrical double layer capacitor. In other words, the technique disclosed herein is not limited to secondary batteries of a specific type and can be applied without any particular limitations to secondary batteries in general which have a structure of a sealed battery.

1. Structure of Sealed Battery

Figure 2:
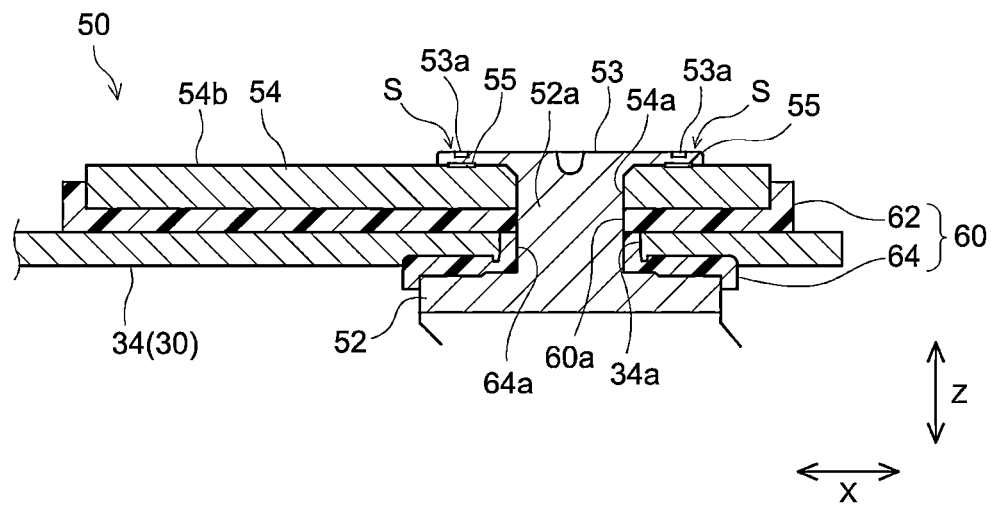
FIG. 2 is a sectional view schematically showing a structure in a vicinity of an electrode terminal on a negative electrode side of the sealed battery according to the embodiment.
Figure 3:
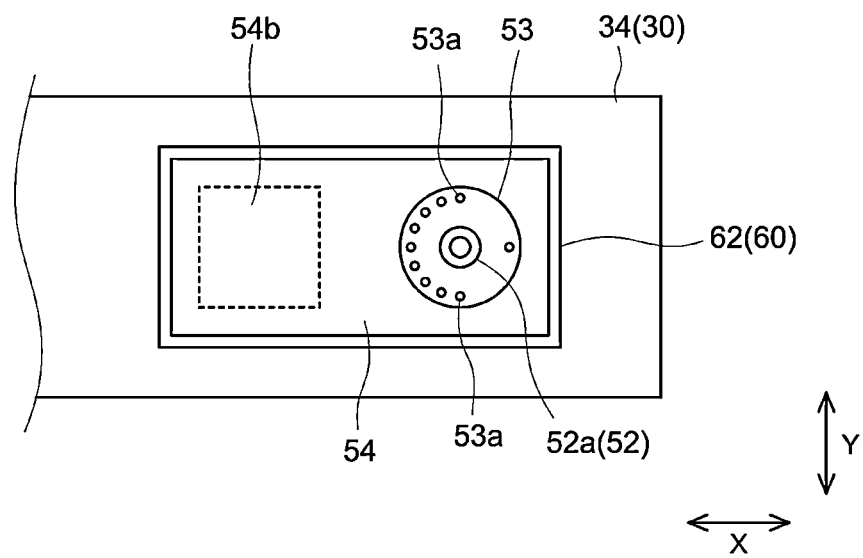
FIG. 3 is a plan view schematically showing the structure in the vicinity of the electrode terminal on the negative electrode side of the sealed battery according to the embodiment.
Figure 4:
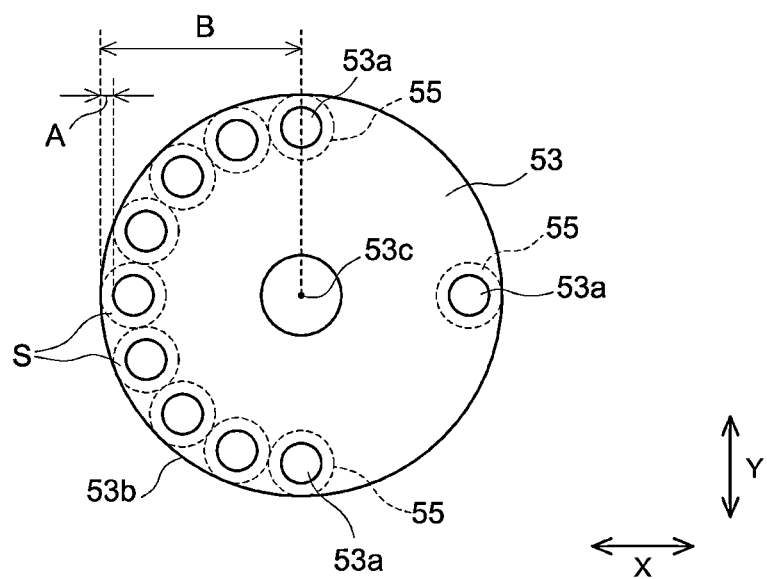
FIG. 4 is a plan view showing an enlargement of a cap portion of a first member shown in FIG. 3.
Figure 5:
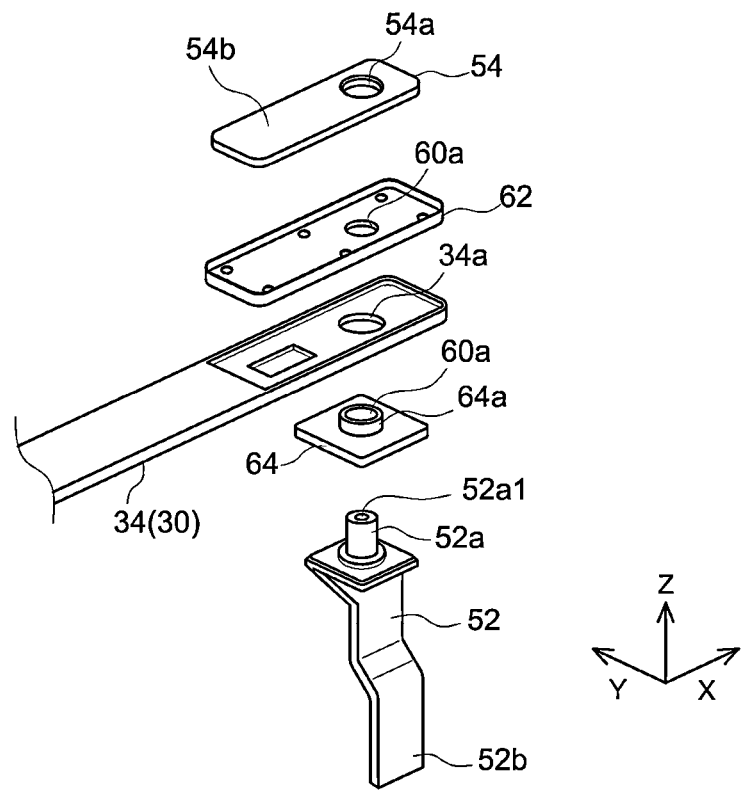
FIG. 5 is an exploded perspective view of the electrode terminal of the sealed battery according to the embodiment.

First, a structure of the sealed battery according to a present embodiment will be described with reference to FIGS. 1 to 5. FIG. 1 is a partial sectional view in a front view of the sealed battery according to the present embodiment. FIG. 2 is a sectional view schematically showing a structure in a vicinity of an electrode terminal on a negative electrode side of the sealed battery according to the present embodiment. FIG. 3 is a plan view schematically showing the structure in the vicinity of the electrode terminal on the negative electrode side of the sealed battery according to the present embodiment. FIG. 4 is a plan view showing an enlargement of a cap portion of a first member shown in FIG. 3. FIG. 5 is an exploded perspective view of the electrode terminal of the sealed battery according to the present embodiment.

As shown in FIG. 1, a sealed battery 10 according to the present embodiment includes an electrode body 20, a case 30, and a pair of electrode terminals 40 and 50. Hereinafter, each component will be described.

(1) Electrode Body

The electrode body 20 is a power generation element housed inside the case 30. The electrode body 20 includes an elongated sheet-shaped positive electrode 21, an elongated sheet-shaped negative electrode 22, and elongated sheet-shaped separators 23 and 24. The electrode body 20 according to the present embodiment is a wound electrode body in which these elongated sheet-shaped members are wound in layers. It should be noted that the structure of the electrode body according to the technique disclosed herein is not limited to a wound electrode body and structures that can be adopted in a general sealed battery can be adopted without limitation. For example, the electrode body may be a laminated electrode body in which a positive electrode and a negative electrode, each of which has a rectangular sheet shape, are laminated via a separator.

The positive electrode 21 includes a positive electrode current collector 21a that is a foil-shaped conductive member and a positive electrode active material layer 21b applied to a surface (preferably, both surfaces) of the positive electrode current collector 21a. In one side edge portion (a left-side side edge portion in FIG. 1) of the electrode body 20 in the width direction X, the positive electrode active material layer 21b is not formed but a positive electrode exposed portion 21c is formed in which the positive electrode current collector 21a is exposed. On the other hand, the negative electrode 22 includes a negative electrode current collector 22a that is a foil-shaped conductive member and a negative electrode active material layer 22b applied to a surface (preferably, both surfaces) of the negative electrode current collector 22a. In addition, in another side edge portion (a right-side side edge portion in FIG. 1) of the electrode body 20 in the width direction X, the negative electrode active material layer 22b is not formed but a negative electrode exposed portion 22c is formed in which the negative electrode current collector 22a is exposed. Furthermore, the separators 23 and 24 are insulating sheets having a plurality of minute holes which a charge carrier (for example, lithium ions) can pass through. Each of the separators 23 and 24 is arranged between the positive electrode 21 and the negative electrode 22. It should be noted that materials which can be used in a conventional general secondary battery (for example, a lithium-ion secondary battery) can be selected without any particular limitations as materials of the respective constituent members (the positive electrode 21, the negative electrode 22, and the separators 23 and 24) of the electrode body 20. In addition, since the materials of the constituent members of the electrode body 20 described above do not limit the technique disclosed herein, detailed descriptions of the materials will be omitted.

In addition, in the sealed battery 10 according to the present embodiment, a liquid electrolyte (electrolyte solution) infiltrates the inside of the electrode body 20 (typically, between the positive electrode 21 and the negative electrode 22). Furthermore, the sealed battery 10 is configured so that a charge/discharge reaction occurs due to a movement of a charge carrier (for example, lithium ions) between the positive electrode 21 and the negative electrode 22 via the electrolyte solution. It should be noted that a form of the electrolyte is not limited to a liquid electrolyte and may alternatively be a gel-like polymer electrolyte or a solid electrolyte. In addition, materials that can be used in a conventional general secondary battery can be similarly used as components of the electrolyte solution without any particular limitations, and since the components of the electrolyte solution do not limit the technique disclosed herein, a detailed description thereof will be omitted.

(2) Case

The case 30 is a container which houses the electrode body 20. The case 30 according to the present embodiment is a flat square container. The case 30 includes a square case body 32 of which an upper surface is opened and a plate-shaped lid 34 which closes an opening portion of the case body 32. In addition, the case 30 is sealed by joining the case body 32 and the lid 34 to each other by laser welding or the like. Furthermore, although details will be provided later, a terminal insertion hole 34a into which a connecting portion 52a of a first member 52 of an electrode terminal 50 is to be inserted is formed in the lid 34 according to the present embodiment (refer to FIGS. 2 and 5). A metal material (such as aluminum, an aluminum alloy, or the like) having required strength can be used as the case 30.

(3) Electrode Terminal

The sealed battery 10 according to the present embodiment includes the pair of electrode terminals 40 and 50. The electrode terminals 40 and 50 are conductive members to act as a conductive path that connects the electrode body 20 inside the case 30 and an external conductive member (not illustrated) to each other. It should be noted that, in the present specification, an "external conductive member" refers to a conductive member that connects an external device such as a vehicle or another battery and the sealed battery to each other. Examples of the external conductive member include a busbar that is a plate-shaped conductive member and a cable that is a linear conductive member.

One of the pair of electrode terminals 40 and 50 is a positive electrode-side electrode terminal 40 (positive electrode terminal) to be connected to the positive electrode 21. In addition, the other is a negative electrode-side electrode terminal 50 (negative electrode terminal) to be connected to the negative electrode 22. The positive electrode terminal 40 and the negative electrode terminal 50 have approximately the same structure. Hereinafter, a detailed structure of an electrode terminal will be described by focusing on the negative electrode terminal 50. However, the following description is not intended to limit an object of application of the technique disclosed herein to a negative electrode terminal. In other words, the technique disclosed herein encompasses aspects including a positive electrode terminal of which a structure is approximately the same as that of the negative electrode terminal 50 to be described below.

As shown in FIG. 2, the electrode terminal 50 of the sealed battery 10 according to the present embodiment includes the first member 52 and a second member 54. In addition, in the present embodiment, an insulating member 60 is provided which prevents the electrode terminal 50 and the case 30 from becoming conductive. Hereinafter, each of the first member 52, the second member 54, and the insulating member 60 will be described.

(a) First Member

The first member 52 is a conductive member which is connected to the electrode body 20 inside the case 30 and has the connecting portion 52a exposed to the outside of the case 30. As shown in FIGS. 1 and 5, the first member 52 according to the present embodiment is an elongated conductive member that extends along a height direction Z. A lower end 52b of the first member 52 is electrically connected to the electrode body 20 inside the case 30. For example, the lower end 52b of the first member 52 on a negative electrode side is connected to the negative electrode exposed portion 22c of the electrode body 20. On the other hand, as shown in FIG. 2, the connecting portion 52a which penetrates the case 30 (the lid 34) and the second member 54 and which is exposed to the outside of the case 30 is formed at an upper end of the first member 52. Specifically, in the present embodiment, terminal insertion holes 34a, 60a, and 54a are respectively formed in the lid 34, the insulating member 60, and the second member 54 (refer to FIG. 5). The upper end of the connecting portion 52a is exposed to the outside of the case 30 by inserting the connecting portion 52a of the first member 52 into the terminal insertion holes 34a, 60a, and 54a.

In addition, as shown in FIGS. 2 to 4, in the sealed battery 10 according to the present embodiment, a cap portion 53 with a flat plate shape is formed at the upper end of the connecting portion 52a of the first member 52 which is exposed to the outside of the case 30. The cap portion 53 is molded by pressing and deforming (caulking) the upper end of the connecting portion 52a of the first member 52 toward the second member 54. Although details will be provided later, forming the cap portion 53 by caulking causes the first member 52 and the second member 54 to be fixed to the lid 34 (the case 30) and connects the first member 52 and the second member 54 to each other. In addition, as shown in FIGS. 3 and 4, the cap portion 53 according to the present embodiment is molded so as to assume an approximately circular shape in a plan view.

(b) Second Member

The second member 54 is a plate-shaped conductive member which is arranged outside of the case 30 and has a connection region 54b to be connected to an external conductive material. In other words, the second member 54 is connected to an external device such as a vehicle via an external conductive material such as a busbar. As shown in FIGS. 2 and 5, the second member 54 is a plate-shaped member that extends along a width direction X. The terminal insertion hole 54a into which the connecting portion 52a of the first member 52 is to be inserted is formed at one end of the second member 54 in the width direction X. In addition, the other end of the second member 54 in the width direction X is provided with the connection region 54b. The connection region 54b according to the present embodiment is a flat region where holes, protrusions, and the like are not formed. Bringing the external conductive material into surface contact with the flat connection region 54b and joining the external conductive material with the connection region 54b enables the sealed battery 10 and an external device to be electrically connected to each other.

(c) Insulating Member

In the present embodiment, the insulating member 60 is provided which prevents the electrode terminal 50 and the case 30 from becoming conductive. As shown in FIG. 2, the insulating member 60 includes an insulated holder 62 and a gasket 64. The insulated holder 62 is a plate-shaped insulator that is arranged on the outside of the case 30 (an upper surface of the lid 34) and prevents the second member 54 and the lid 34 from becoming conductive. On the other hand, the gasket 64 is an approximately rectangular insulator that is arranged inside the case 30 (a lower surface of the lid 34) and prevents the first member 52 and the lid 34 from becoming conductive. In addition, the gasket 64 has a cylindrical protrusion 64a. The cylindrical protrusion 64a is inserted into the terminal insertion hole 34a of the lid 34 and pressure-bonded to a bottom surface of the insulated holder 62. Accordingly, the terminal insertion hole 60a of the insulating member 60 and the terminal insertion hole 34a of the lid 34 are arranged at a same position.

(d) Connection Between First Member and Second Member

In addition, in the sealed battery 10 according to the present embodiment, the first member 52 and the second member 54 are connected to each other by localized ultrasonic joining. Specifically, as shown in FIGS. 2 to 4, a plurality of (10 in the drawings) recessed portions 53a are formed on the upper surface of the cap portion 53 of the first member 52 in the present embodiment. The plurality of recessed portions 53a are dents which are formed when performing the localized ultrasonic joining described above. In addition, a bonding portion 55 due to an intermetallic bond is formed on a boundary between the first member 52 (the bottom surface of the cap portion 53) and the second member 54 below each recessed portion 53a (refer to FIG. 2). The bonding portion 55 due to an intermetallic bond has a lower resistance as compared to a welding mark created by laser welding or the like. Therefore, a contact resistance between the first member 52 and the second member 54 can be reduced and the electrode terminal 50 having superior conductivity can be constructed.

2. Manufacturing Method of Sealed Battery

Figure 6:
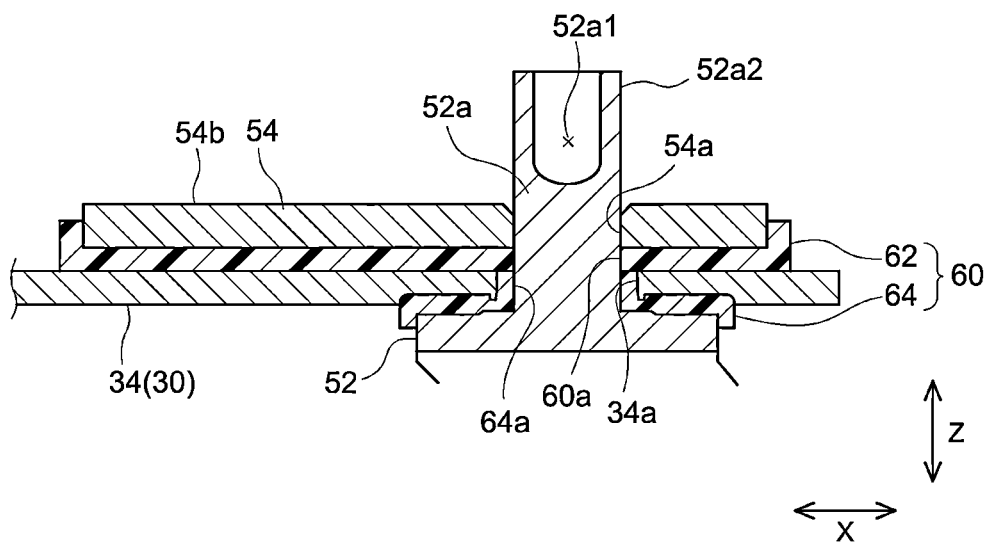
FIG. 6 is a sectional view schematically showing a state prior to performing a step of caulking in a manufacturing method according to the embodiment.
Figure 7:
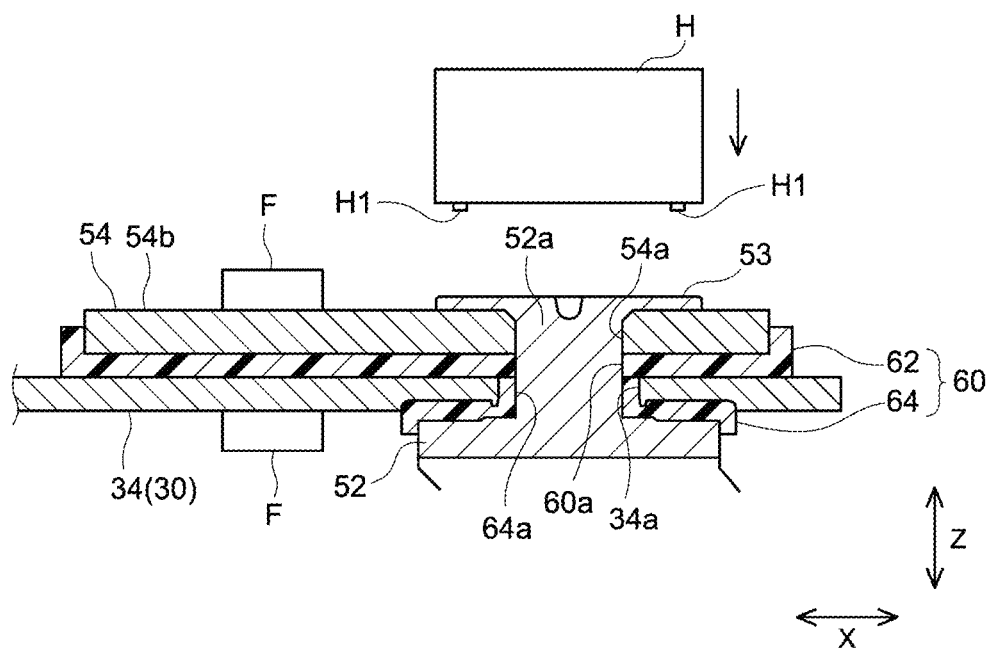
FIG. 7 is a sectional view schematically showing a step of performing ultrasonic joining in the manufacturing method according to the embodiment.

Next, a method of manufacturing the sealed battery configured as described above will be described with reference to the drawings. FIG. 6 is a sectional view schematically showing a state prior to performing a step of caulking in the manufacturing method according to the present embodiment. FIG. 7 is a sectional view schematically showing a step of performing ultrasonic joining in the manufacturing method according to the present embodiment.

First, in the present embodiment, as shown in FIG. 5, the constituent members (the first member 52 and the second member 54) of the electrode terminal 50 and the constituent members (the insulated holder 62 and the gasket 64) of the insulating member 60 are prepared. It should be noted that the first member 52 prior to forming the electrode terminal 50 is provided with the cylindrical connecting portion 52a at an upper end in the height direction Z. Although details will be provided later, by deforming the cylindrical connecting portion 52a, the cap portion 53 such as that shown in FIGS. 2 to 4 is formed.

In addition, the manufacturing method according to the present embodiment forms the electrode terminal 50 using the members described above by performing the steps of (1) assembly, (2) caulking, and (3) ultrasonic joining. Hereinafter, each step will be described.

(1) a Step of Performing Assembly

In the present step, the second member 54 is arranged outside of the case 30 and the connecting portion 52a of the first member 52 is penetrated through each of the case 30 and the second member 54. Accordingly, as shown in FIG. 6, constituent members of the electrode terminal can be assembled to the case 30 so that an upper end 52a2 of the connecting portion 52a of the first member 52 is exposed outside of the case 30.

An example of specific procedures of the present step is as follows. First, the insulated holder 62 is arranged on the upper surface of the lid 34. At this point, an arrangement position of the insulated holder 62 is adjusted so that the terminal insertion hole 34a of the lid 34 and the terminal insertion hole 60a of the insulating holder 62 overlap with each other. Next, the protrusion 64a of the gasket 64 is inserted from a lower surface side of the lid 34 into the terminal insertion hole 34a of the lid 34. In addition, a region in a periphery of the terminal insertion hole 60a is pressed along the height direction Z. Accordingly, the bottom surface of the insulated holder 62 and the upper surface of the protrusion 64a of the gasket 64 are pressure-bonded to each other and the insulating member 62 is attached to the lid 34. Next, in the present embodiment, the plate-shaped second member 54 is arranged on the insulated holder 62. At this point, an arrangement position of the second member 54 is adjusted so that the terminal insertion hole 54a of the second member 54 and the terminal insertion hole 60a of the insulating member 60 overlap with each other. In addition, the connecting portion 52a of the first member 52 is inserted into the terminal insertion holes 54a and 60a of the second member 54 and the insulating member 60 from a lower side of the lid 34 (inside of the case 30). Accordingly, the upper end 52a2 of the connecting portion 52a of the first member 52 is exposed on the outside of the case 30 (an upper side of the lid 34) (refer to FIG. 6).

(2) a Step of Performing Caulking

In the present step, caulking is performed in which the upper end 52a2 of the connecting portion 52a of the first member 52 is pressed and deformed toward the second member 54. Accordingly, the cap portion 53 (refer to FIGS. 2 to 4) with a disk shape is formed in the connecting portion 52a of the first member 52 and the first member 52 and the second member 54 can be fixed to the case 30.

An example of specific procedures of the present step is as follows. First, an internal cavity 52a1 is formed in the cylindrical connecting portion 52a that is exposed to the outside of the case 30. In the present step, a pressing member (not illustrated) is inserted into the internal cavity 52a1 of the connecting portion 52a and the upper end 52a2 of the connecting portion 52a is pressed and deformed so as to expand outward in a radial direction. Accordingly, the disk-shaped cap portion 53 (refer to FIG. 7) is formed at an upper end of the connecting portion 52a. Furthermore, in the present step, the formed cap portion 53 is pressed toward the second member 54. Accordingly, each of the connecting portion 52a of the first member 52, the second member 54, and the insulating member 60 deforms to close the terminal insertion holes 54a, 60a, and 34a and, at the same time, the first member 52 and the second member 54 are fixed to the case 30 (the lid 34).

(3) a Step of Performing Ultrasonic Joining

In the present step, as shown in FIG. 7, the cap portion 53 is pressed toward the second member 54 using a horn H having a plurality of protruded portions H1 and, at the same time, ultrasonic waves are applied from each of the plurality of protruded portions H1. By performing such localized ultrasonic joining, a plurality of recessed portions 53a are formed on the upper surface of the cap portion 53 and, at the same time, the bonding portion 55 (refer to FIG. 2) due to an intermetallic bond is formed on the boundary between the first member 52 and the second member 54 below each of the plurality of recessed portions 53a.

An example of specific procedures of the present step is as follows. First, a region in which the second member 54, the insulated holder 62, and the lid 34 are laminated (for example, a vicinity of the connection region 54b) is sandwiched by a pair of fixing members F. Accordingly, since the second member 54 that is an object of joining is fixed, ultrasonic joining of the first member 52 and the second member 54 is made easier. Next, in the present embodiment, the horn H having a plurality of (10) protruded portions H1 is prepared, and ultrasonic waves are applied from each protruded portion H1 of the horn H while pressing the protruded portions H1 against the upper surface of the cap portion 53 and applying pressure toward the second member 54. At this point, in a portion pressed by the protruded portions H1, minute vibrations of the ultrasonic waves cause the first member 52 and the second member 54 to rub against each other. Accordingly, an oxide layer formed on a surface of each member is destroyed and a clean metal surface (a newly formed surface) is exposed. Subsequently, by plastically deforming each of the first member 52 and the second member 54 with pressure from the protruded portions H1, the newly formed surfaces of the respective members are bonded in a solid phase state. As a result, the bonding portion 55 due to an intermetallic bond is formed on the boundary between the first member 52 and the second member 54 (refer to FIG. 2). In addition, a dent (a recessed portion 53a) corresponding to a shape of the protruded portion H1 of the horn H is formed in a portion pressed by the protruded portion H1.

Pressure when the protruded portion H1 of the horn H presses the cap portion 53 is favorably 10 N or higher, more favorably 100 N or higher, even more favorably 150 N or higher, and particularly favorably 200 N or higher. Accordingly, the first member 52 can be plastically deformed in an appropriate manner and the bonding portion 55 can be readily formed. On the other hand, from the perspective of reliably preventing damage to parts (for example, the cap portion 53), an upper limit value of the pressure from the protruded portion H1 is favorably 500 N or lower, more favorably 450 N or lower, even more favorably 400 N or lower, and particularly favorably 300 N or lower. In addition, a frequency of the ultrasonic waves applied from the protruded portion H1 is favorably 81 kHz or lower. Accordingly, newly formed surfaces can be appropriately created and the bonding portion 55 can be readily formed on the boundary between the first member 52 and the second member 54. On the other hand, from the perspective of reliably preventing damage to parts, an upper limit value of the frequency of the ultrasonic waves applied in ultrasonic joining is favorably 19 kHz or higher. Furthermore, a period of time (joining time) during which the ultrasonic waves are applied is favorably 0.03 seconds or longer, more favorably 0.1 seconds or longer, and particularly favorably 0.3 seconds or longer. Accordingly, the first member 52 and the second member 54 can be more preferably bonded to each other. On the other hand, when the joining time exceeds 0.5 seconds, the first member 52 and the second member 54 are more or less reliably joined to each other. Therefore, from the perspective of suppressing a decline in manufacturing efficiency due to prolongation of the joining time, an upper limit value of the joining time is favorably 3 seconds or shorter, more favorably 1 second or shorter, and particularly favorably 0.5 seconds or shorter.

As described above, with the manufacturing method according to the present embodiment, the bonding portion 55 due to an intermetallic bond is formed on the boundary between the first member 52 and the second member 54. Since the bonding portion 55 due to an intermetallic bond does not contain metal oxides, resistance is lower as compared to a welding mark created by hot welding using a laser or the like. Therefore, according to the present embodiment, the electrode terminal 50 in which a contact resistance between the first member 52 and the second member 54 is low and which has superior conductivity can be fabricated.

In addition, with hot welding using a laser or the like, spatter may scatter when welding the first member and the second member to each other and may adhere to members (for example, the lower surface of the lid and the lower end of the first member) which are arranged inside the case. In such a case, conductive foreign objects can contaminate the inside of the battery and cause an internal short circuit. By comparison, with the ultrasonic joining used in the manufacturing method according to the present embodiment, spatter such as that created by laser welding does not occur. Therefore, the manufacturing method according to the present embodiment also contributes toward suppressing an internal short circuit due to contamination by conductive foreign objects.

Furthermore, when creating the electrode terminal, a slight gap (clearance) may be created between the cap portion of the first member and the second member after caulking. In this case, there is a possibility that the first member and the second member are not sufficiently connected and conductivity of the electrode terminal declines significantly. In addition, with conventional laser welding, it is difficult to appropriately connect the first member and the second member to each other once such a slight gap has been created. On the other hand, with the manufacturing method according to the present embodiment, since ultrasonic joining is performed while pressing the cap portion of the first member toward the second member, even if a gap has been created between the cap portion of the first member and the second member after caulking, the first member and the second member can be connected so as to squash the gap. Therefore, according to the present embodiment, an occurrence of an electrode terminal with significantly declined conductivity can be reliably prevented.

3. Other Aspects

An embodiment of the technique disclosed herein has been described above. However, the technique disclosed herein is not limited to the embodiment described above and various structures can be modified.

(1) Number of Formed Recessed Portions

In the embodiment described above, since localized ultrasonic joining is performed using a horn having 10 recessed portions, 10 recessed portions 53a are formed in the cap portion 53 of the first member 52 after being manufactured (refer to FIGS. 3 and 4). However, the number of locations where localized ultrasonic joining is performed (in other words, the number of the recessed portions 53a after being manufactured) is not particularly limited and can be changed as appropriate in consideration of dimensions of the cap portion 53 and the like. As the number of joined locations (the number of the recessed portions 53a) increase, connection strength between the first member 52 and the second member 54 increases and, at the same time, a larger number of the low-resistance bonding portions 55 are to be formed. From this perspective, the number of recessed portions 53a formed in the cap portion 53 is favorably 3 or more, more favorably 4 or more, even more favorably 5 or more, and particularly favorably 6 or more. On the other hand, forming too many recessed portions 53a in the cap portion 53 may possibly cause strength of the cap portion 53 itself to decline. From this perspective, an upper limit of the number of recessed portions 53a is favorably 12 or less, more favorably 11 or less, and particularly favorably 10 or less.

(2) Shape of Recessed Portions

In addition, as shown in FIGS. 3 and 4, in the embodiment described above, the horn H is provided with protruded portions H1 that are approximately circular in a plan view so that approximately circular recessed portions 53a are formed in the cap portion 53 after being manufactured. However, the shape of the protruded portions H1 of the horn H (in other words, the shape of the recessed portions 53a after being manufactured) is not particularly limited and a shape other than a circle (for example, a square) can also be adopted. When approximately circular protruded portions H1 are used as in the embodiment described above, the cap portion 53 can be evenly deformed centered on the protruded portions H1. In addition, using the approximately circular protruded portions H1 also has an effect of enabling ultrasonic waves from the protruded portions H1 to be uniformly applied to the cap portion 53. Accordingly, as shown in FIG. 4, the bonding portion 55 with an approximately circular shape centered on the recessed portion 53a is formed and the first member 52 and the second member 54 can be suitably connected to each other at low resistance.

When the recessed portion 53a with an approximately circular shape as described above is formed, a radius of the recessed portion 53a is favorably 0.25 mm or longer, more favorably 0.3 mm or longer, even more favorably 0.5 mm or longer, and particularly favorably 0.75 mm or longer. Accordingly, the bonding portion 55 with a sufficient area can be formed below the recessed portion 53a. On the other hand, making the recessed portion 53a excessively large may possibly cause strength of the cap portion 53 itself to decline. From this perspective, an upper limit of the radius of the recessed portion 53a is favorably 1.5 mm or shorter, more favorably 1.3 mm or shorter, even more favorably 1.2 mm or shorter, and particularly favorably 1.0 mm or shorter.

(3) Position of Formation of Recessed Portions in Radial Direction

Figure 8:
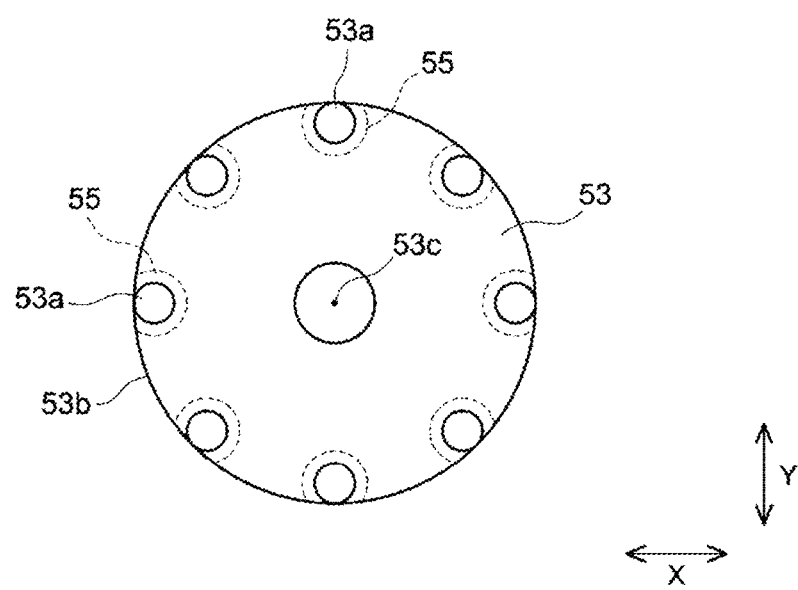
FIG. 8 is a plan view showing an enlargement of a cap portion of a first member of a sealed battery according to another embodiment.

As shown in FIG. 4, in the embodiment described above, a pressing position in the radial direction is adjusted so that a gap S is created between an outer peripheral edge 53b and the recessed portion 53a of the cap portion 53 in the sealed battery after being manufactured. As described above, in the technique disclosed herein, the bonding portion 55 due to an intermetallic bond is formed by plastically deforming the cap portion 53 while applying ultrasonic waves when performing ultrasonic joining. When pressing a region adjacent to the outer peripheral edge 53b of the cap portion 53 as shown in FIG. 8, an outward deformation amount of the cap portion 53 in the radial direction decreases and an area of the bonding portion 55 in the electrode terminal 50 after being manufactured tends to become narrower. From this perspective, as shown in FIG. 4, ultrasonic joining is favorably performed while pressing a position where the gap S is created between the outer peripheral edge 53b and the recessed portion 53a of the cap portion 53. Accordingly, the bonding portion 55 with a wide area can be secured and conductivity of the electrode terminal 50 can be further improved.

On the other hand, from the perspective of deformability of the cap portion 53, a region that is close to the outer peripheral edge 53b than a center 53c of the cap portion 53 is favorably pressed. In other words, in the technique disclosed herein, ultrasonic joining is favorably performed while pressing a position which is close to the outer peripheral edge 53b of the cap portion 53 but which avoids coming into contact with the outer peripheral edge 53b of the cap portion 53 (in other words, where the gap S is created). Accordingly, the bonding portion 55 with a sufficient area can be readily formed on the boundary between the first member 52 and the second member 54. Specifically, when a distance from an outer edge of the recessed portion 53a to the outer peripheral edge 53b of the cap portion 53 is noted by A and a distance from the center 53c to the outer peripheral edge 53b of the cap portion 53 is denoted by B, the position of formation of the recessed portion 53a is favorably determined so as to satisfy Expression (1) below.

$$0<A<0.3B \tag{1}$$

From the perspective of more readily causing the cap portion 53 to plastically deform, an upper limit value of the distance A in Expression (1) above may be 0.2B or smaller, favorably 0.1B or smaller, more favorably smaller than 0.1B, even more favorably 0.05B or smaller, and particularly favorably smaller than 0.05B. On the other hand, from the perspective of further widening the area of the bonding portion 55, a lower limit value of the distance A in Expression (1) above is favorably 0.01B or larger. In addition, not all of the recessed portions 53a formed in the cap portion 53 need to be formed at positions satisfying Expression (1) above. For example, the bonding portion 55 having a sufficient area can be readily formed as long as 60% or more (preferably 70% or more and more preferably 80% or more) of the recessed portions 53a are formed at positions satisfying Expression (1).

(4) Position of Formation of Recessed Portions in Circumferential Direction

As shown in FIG. 3, in the embodiment described above, a major portion (in FIG. 3, 9 out of 10) of the plurality of recessed portions 53a are formed in a region that opposes the connection region 54b of the second member 54. However, a position of formation of the recessed portions 53a in the circumferential direction is not particularly limited and, as shown in FIG. 8, all of the recessed portions 53a may be equally formed in the circumferential direction. It should be noted that, as shown in FIG. 3, when a major portion of the recessed portions 53a are formed in a region that opposes the connection region 54b of the second member 54, a conductive path from the first member 52 to an external conductive material (the connection region 54b) becomes shorter. Accordingly, conductivity of the electrode terminal 50 can be further improved. The number of recessed portions 53a formed at positions opposing the connection region 54b is favorably 60% or more of a total number of the recessed portions 53a, more favorably 70% or more of the total number of the recessed portions 53a, and particularly favorably 80% or more of the total number of the recessed portions 53a. Accordingly, the electrode terminal 50 with more superior conductivity can be fabricated. On the other hand, from the perspective of preventing locations with significantly low connection strength from being created in the circumferential direction, a part of the plurality of recessed portions 53a are favorably formed in a region on an opposite side to the connection region 54b. From this perspective, the number of recessed portions 53a formed at positions opposing the connection region 54b is favorably 95% or less of the total number of the recessed portions 53a and more favorably 90% or less of the total number of the recessed portions 53a.

(5) Shape of Cap Portion

In addition, in the embodiment described above, the first member 52 including the cylindrical connecting portion 52a is used to press and deform the cylindrical connecting portion 52a in the step of caulking to form the disk-shaped cap portion 53. However, shapes of the connecting portion 52a prior to being manufactured and the cap portion 53 after being manufactured are not limited to the embodiment described above and various shapes can be adopted without particular limitation. For example, using the first member including a quadrangular prism-shaped connecting portion having an internal cavity, the quadrangular prism-shaped connecting portion may be pressed and deformed in the step of caulking. In this case, the cap portion with an approximately rectangular shape in a plan view is to be formed at an upper end of the connecting portion of the first member. Even when forming such a cap portion, the first member and the second member can be suitably fixed to each other. When taking deformability of the cap portion in an intermetallic bond into consideration, it is more favorable to form the cap portion 53 with a disk shape as in the embodiment described above.

(6) Constituent Members of Electrode Terminal

In the embodiment described above, the electrode terminal 50 constituted by only the first member 52 and the second member 54 is used. However, the constituent members of the electrode terminal are not limited to only the first member and the second member, and even when fabricating an electrode terminal constituted by three or more components, the technique disclosed herein can be applied. For example, in the embodiment described above, the first member 52 and the electrode body 20 are directly connected to each other (refer to FIG. 2). However, another conductive member (a third member) may be arranged between the first member and the electrode body and the first member and the electrode body may be connected to each other via the third member. Even when using such a third member, the technique disclosed herein can be applied as long as the cap portion is formed by exposing the upper end of the first member to the outside of the case.

In addition, as shown in FIGS. 1 to 3, the second member 54 according to the embodiment described above has the flat connection region 54b. However, the connection region 54b of the second member 54 is not particularly limited as long as an external connecting member can be connected. For example, a second member configured such that a connection region is provided with a bolt and the external connecting member is fixed by tightening a nut or the like to the bolt can also be used. Furthermore, the connection region of the second member may be provided with a structure into which a cable-like external connecting member is inserted to be fixed to the connection region of the second member.

(7) Materials of Respective Members

Materials of the respective members that constitute the electrode terminal are not particularly limited and materials that can be used in an electrode terminal of a sealed battery can be used without any particular limitations. For example, as the first member and the second member, a metal member with superior strength and conductivity such as aluminum, copper, nickel, iron, and alloys thereof can be used. The technique disclosed herein can be particularly preferably applied to an electrode terminal in which raw materials of the first member and the second member differ from each other. For example, when the terminal connection location (for example, the negative electrode exposed portion 22c in FIG. 1) of the electrode body and an external connecting member are made of different raw materials, favorably, the first member 52 is made of a same raw material as the terminal connection location of the electrode body 20 and the second member 54 is made of a same raw material as the external connecting member. In such a case, the first member 52 and the second member 54 are metal members of different types. While it is difficult to connect such metal members of different types to each other by hot welding such as laser welding and there is a risk that a decline in strength due to a poor weld or an increase in resistance of a connecting portion may occur, when the first member 52 and the second member 54 are connected to each other by localized ultrasonic joining as in the technique disclosed herein, even when the first member 52 and the second member 54 are metal members of different types, the first member 52 and the second member 54 can be strongly connected to each other without causing an increase in resistance. In other words, the technique disclosed herein can exhibit a particularly preferable effect when the first member 52 and the second member 54 are dissimilar metals.

While specific examples of the present disclosure have been described in detail, such specific examples are merely illustrative and are not intended to limit the scope of claims. Techniques described in the scope of claims include various modifications and changes made to the specific examples illustrated above.

What is claimed is:

1. A sealed battery comprising: a case which houses an electrode body; and an electrode terminal for electrically connecting the electrode body and an external conductive material with each other, wherein
the electrode terminal includes:
a first member which is a conductive member to be connected to the electrode body inside the case and which has a connecting portion that is exposed to outside of the case; and
a second member which is a plate-shaped conductive member arranged outside of the case, which has a connection region to be connected to the external conductive material, and which connected to the connecting portion of the first member,
an upper end of the connecting portion of the first member penetrates the case and the second member and forms a cap portion having a flat plate shape outside of the second member, and
a plurality of recessed portions are formed on an upper surface of the cap portion, and a bonding portion configured due to an ultrasonic joining is formed on a boundary, which is between the first member and the second member, below each of the plurality of recessed portions.

2. The sealed battery according to claim 1, wherein a shape of the cap portion in plan view is an approximate circle.

3. The sealed battery according to claim 1, wherein 3 to 12 recessed portions are formed on the upper surface of the cap portion.

4. The sealed battery according to claim 1, wherein 60% or more of the plurality of recessed portions are formed in a region, which opposes the connection region of the second member, of the upper surface of the cap portion.

5. The sealed battery according to claim 1, wherein 60% or more of the plurality of recessed portions have a gap between an outer peripheral edge of the cap portion and the recessed portions.

6. The sealed battery according to claim 5, wherein when a distance between an outer edge of the recessed portion to the outer peripheral edge of the cap portion is denoted by A and a distance between a center of the cap portion to the outer peripheral edge of the cap portion is denoted by B, 60% or more of the plurality of recessed portions are formed at positions satisfying Expression (1) below:

$$0<A<0.3B \qquad (1).$$

7. The sealed battery according to claim 1, wherein the first member and the electrode body are directly connected to each other inside the case.

8. A method of manufacturing the sealed battery according to claim 1, the method comprising:
a step of performing assembly by arranging the second member outside of the case, causing a connecting portion of the first member to penetrate each of the case and the second member, and exposing an upper end of the connecting portion to outside of the case;
a step of performing caulking by forming a cap portion having a flat plate shape by pressing and deforming the upper end of the connecting portion of the first member toward the second member; and
a step of performing ultrasonic joining by forming a plurality of recessed portions on the upper surface of the cap portion by pressing the cap portion toward the second member by using a horn having a plurality of protruded portions and, at the same time, applying ultrasonic waves from each of the plurality of protruded portions, and forming a bonding portion configured due to an intermetallic bond on the boundary, which is between the first member and the second member, below each of the plurality of recessed portions.

9. The manufacturing method of the sealed battery according to claim 8, wherein in the step of performing ultrasonic joining, pressure when each of the plurality of protruded portions presses the cap portion ranges from 10 N to 500 N.

10. The manufacturing method of the sealed battery according to claim 8, wherein in the step of performing ultrasonic joining, a frequency of the ultrasonic waves applied from the plurality of protruded portions ranges from 19 kHz to 81 kHz.

11. The manufacturing method of the sealed battery according to claim 8, wherein in the step of performing ultrasonic joining, a period of time during which the ultrasonic waves are applied ranges from 0.03 seconds to 3 seconds.

* * * * *